Dec. 22, 1953 V. V. DIXON ET AL 2,663,108
ANIMATED DECOY AND ACTUATING MEANS THEREFOR
Filed April 16, 1952 2 Sheets-Sheet 1
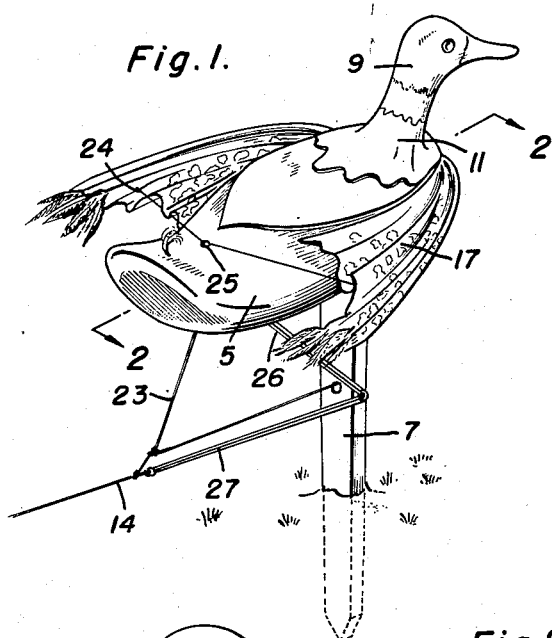
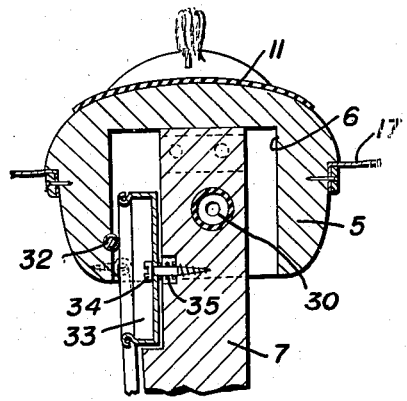
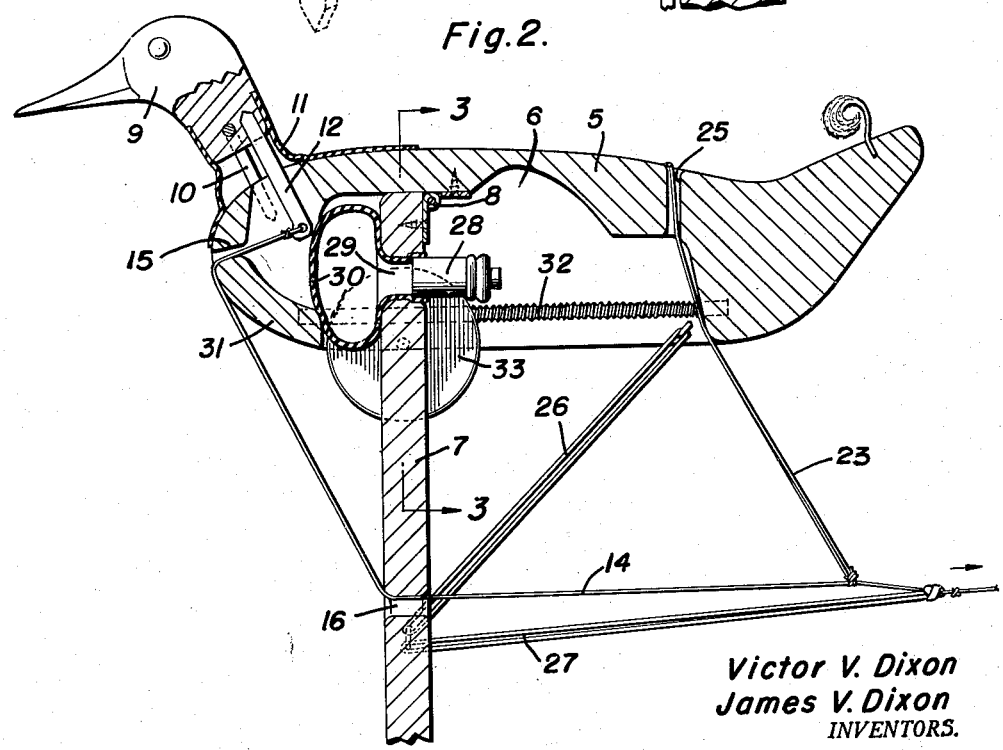
Victor V. Dixon
James V. Dixon
INVENTORS.

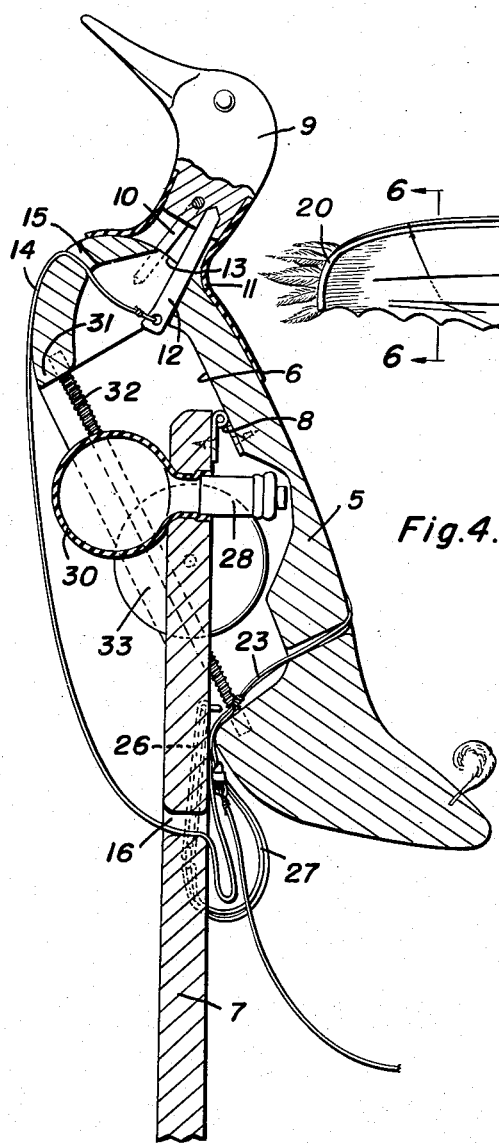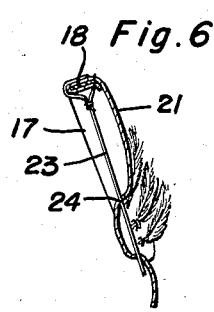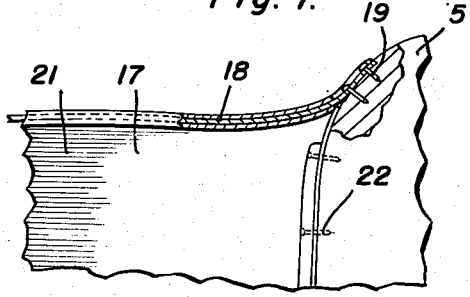
Victor V. Dixon
James V. Dixon
INVENTORS.

Patented Dec. 22, 1953

2,663,108

UNITED STATES PATENT OFFICE 2,663,108

ANIMATED DECOY AND ACTUATING MEANS THEREFOR

Victor V. Dixon and James V. Dixon,
Lebanon, Oreg.

Application April 16, 1952, Serial No. 282,574

9 Claims. (Cl. 43—3)

1

The present invention relates to new and useful improvements in animated decoys designed to simulate the appearance of ducks, geese and other wild fowl and including a movable head, wings and body to realistically simulate the movement of the water fowl while feeding on the surface of a body of water.

An important object of the invention is to provide means carried by the decoy for simulating the natural sounds of the water fowl actuated by the movement of the body of the decoy and to further provide actuating means for the several movable parts of the decoy operated from a remote point.

A further object of invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, references being had to the accompanying drawings forming a part hereof, wherein like numerals refer to like parts throughout, and in which:

Figure 1 is a perspective view;

Figure 2 is an enlarged longitudinal sectional view taken substantially on the line 2—2 of Figure 1;

Figure 3 is a transverse sectional view taken on a line 3—3 of Figure 2;

Figure 4 is a longitudinal sectional view showing the body of the decoy supported in an upwardly tilted position simulating the appearance of water fowl when rising from a body of water;

Figure 5 is a bottom plan view;

Figure 6 is a transverse sectional view of one of the wings taken on the line 6—6 of Figure 5; and Figure 7 is an enlarged fragmentary sectional view of the fastening means for securing the wing to the body.

Referring now to the drawings in detail wherein for the purpose of illustration we have disclosed a preferred embodiment of our invention, the numeral 5 designates a body of the decoy which may be constructed of wood or other suitable material and formed with a recess 6 at its bottom or underside. A stake 7 has its upper end projecting upwardly into the recess 6 and is secured to the body by a hinge structure 8 at a point forwardly of the center of gravity of the body for pivotally supporting the body in a normally upwardly tilted position, as shown in Figure 4 of the drawings.

2

The head of the decoy is designated at 9 and is pivotally connected to the body 5 for vertical swinging, or raising and lowering movement by means of a staple 10 driven into the front upper portion of the body and on the upper portion of which the head is rockably mounted. A rubber sleeve 11 connects the head 9 to the body 5 to provide resilient or elastic means for the head to return the latter to its normal position, after the same has been tilted.

A lever 12 extends downwardly from the head 9 through an opening 13 in the forward portion of the top of body 5 to the lower end of which a rope or other flexible member 14 is attached and which passes therefrom in a forward direction outwardly through an opening 15 in the front end of the body 5 under the head 9, the rope 14 then passing downwardly under the body and through a guide opening 16 in the upper portion of stake 7 to extend in a rearward direction with respect to the body to a remote point.

The body 5 is provided with a pair of wings designated at 17 and of duplicate construction whereby a detailed description of one will suffice for both. Each wing includes a spring steel strap 18 which is attached at its inner end to the forward side portion of body 5 by means of nails, screws or similar fasteners 19 to project laterally from the side of the body and having a rearwardly curved outer end portion 20. The spring 18 is secured to the forward or leading edge of a piece of cloth or other suitable flexible member 21 which is shaped to conform to the wing of the water fowl and the inner edge of the cloth 21 is secured to the side of the body 5 by nails or other suitable fasteners 22.

A cord or other suitable flexible member 23 is attached to the outer portion of spring 18 and passes through openings 24 in the cloth portion 21 of the wing 17 in an inward direction and downwardly through an opening 25 in the top of the rear portion of body 5, the cords 23 for the respective wings then being attached to the cord 14 at a point under the body.

An elastic band or similar resilient member 26 connects the lower rear portion of body 5 to stake 7 and a second elastic band 27 is also attached to stake 7 and extends rearwardly of the decoy and is connected to the rope or cord 14 to pull the latter forwardly.

A pneumatic duck or geese call 28 is supported in an opening 29 in the upper portion of stake 7 and to which a rubber bulb 30 is connected in a position forwardly of the stake and in the recess 6 of the body 5. The rubber bulb 30 is in the path of downward movement of the lower front portion 31 of the body 5 and the bulb 30 is also in position for contact by lever 12, as shown in Figure 2, to compress or force air from the rubber bulb 30, as the front end of the body moves downwardly, to thus sound the pneumatic duck or geese call device 28.

A toothed or annularly grooved rod 32 is supported in a longitudinal position in recess 6 of the body and in engagement with the edge of a cup-shaped or hollow vibrating sound member 33 which is supported at its central portion to one side of stake 7 by means of a screw or other suitable fastening device 34 and with a coil spring 35 mounted on the screw and bearing against the sound member 33 to hold the latter outwardly from contact with the stake. The action of the toothed or annularly grooved rod 32 on the periphery or edge of the sound device 33 as the body 5 is tilted upwardly or downwardly, will set up a vibration of the member 33 to produce a sound simulating the quacking of a duck.

In the operation of the device, the stake 7 is driven into the ground, or in a shallow body of water to support the decoy on the surface of the water. The elastic or resilient member 26 will pull the rear end of the body 5 downwardly to tilt the front end thereof upwardly on the upper end of stake 7 and the elastic member 27 will pull the cords 14 and 23 forwardly whereupon the elastic sleeve 11 will support the head 9 in its normal upright position and the springs 18 will spread the wings 17 outwardly. A pulling force subjected to the cords 14 and 23 will oscillate the head 9 and fold or collapse wings 17 against the side of the body 5 realistically simulating the motion of the head and wings of the water fowl when rising or taking off in flight from the surface of the water. A continued pulling force on cord 14 will swing the front end of the body 5 downwardly to swing into a horizontal position on the upper end of stake 5, as shown in Figure 2 of the drawings, and as the lower front portion 31 of the body engages and contracts the bulb 30 the pneumatic duck call 28 will be sounded.

The tilting movement of body 5 in either an upward or downward direction will cause the toothed or annularly grooved rod 32 to rub against the edge of the sound device 33 to cause a vibration thereof to also simulate the sound of a water fowl.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. An animated decoy of the class described comprising a body, means supporting the body for forward and rearward tilting movement, said body including a movable head, resilient means connecting the body to said supporting means to tilt the body in one direction, flexible means connected to the head and operable from a remote position to tilt the body in an opposite direction, as well as to move the head, and two sound producing means in said body operative successively by tilting of the body in one direction.

2. An animated decoy of the class described comprising a body, means supporting the body for forward and rearward tilting movement said body including a movable head and spring loaded normally spread collapsible wings, resilient means connecting the body to said supporting means to tilt the body in one direction, and flexible means connected to the head and also connected to the wings and operable from a remote position to tilt the body in an opposite direction, as well as to move the head, said flexible means being also connected to the wings to collapse the latter upon actuation of said flexible means.

3. An animated decoy of the class described comprising a body, means supporting the body for forward and rearward tilting movement and a pneumatic sound device positioned in the body and including an expansible and contractible rubber actuating bulb positioned in the path of a part of the body during a predetermined movement of the latter to actuate the sound device.

4. An animated decoy of the class described comprising in combination, a body, a support for the body on which the body is vertically swingable in opposite directions respectively, and a pneumatic sound device carried by the support and including an expansible and contractible rubber actuating bulb mounted on the support in the path of a part of the body during vertical swinging of the latter in one direction to actuate the sound device.

5. An animated decoy of the class described comprising in combination, a body, a support for the body on which the body is vertically swingable in opposite directions respectively, a sound device on the support, and actuating means carried by the body for said sound device to actuate the latter upon swinging of the body in opposite directions.

6. An animated decoy of the class described comprising in combination, a body, a support for the body on which the body is vertically swingable in opposite directions respectively, a head pivoted on the body and including a lever rigidly fixed thereto, a sound device on the support and engageable by the lever to actuate the sound device upon a swinging movement of the body in one direction, and actuating means connected to the lever to simultaneously actuate the head and the sound device.

7. An animated decoy of the class described comprising in combination, a body, a support on which the body is vertically swingable in opposite directions respectively, actuating means for the body, and a two-part sound device including a first part fixed to the support and a second part rigidly fixed to the body in operating position with respect to the first part for actuating the sound device upon a swinging of the body in opposite directions.

8. The combination of claim 7 wherein said second part comprises a notched bar fixed in the body, said first part comprising a hollow metallic vibrating member carried by the support and with which the bar has rubbing contact.

9. An animated decoy of the class described comprising in combination, a body, a support on which the body is pivotally mounted for vertical swinging in opposite directions respectively, a head pivoted to the body, an actuating lever rigidly connected to the head and extending into the body, means connected to the lever for swinging the body downwardly while actuating the head, and a pneumatic sound device in the body and including an air pump engaged and actuated by the lever when the body is swung downwardly.

VICTOR V. DIXON.
JAMES V. DIXON.

References Cited in the file of this patent

UNITED STATES PATENTS

| Number | Name | Date |
|---|---|---|
| 243,954 | North | July 5, 1881 |
| 378,410 | Trimble | Feb. 21, 1888 |
| 953,289 | Pressler | Mar. 29, 1910 |
| 1,447,953 | Herschmann | Mar. 6, 1923 |
| 1,701,734 | Stephens | Feb. 12, 1929 |
| 2,457,295 | Woodhead | Dec. 28, 1949 |
| 2,514,510 | Otreba | July 11, 1950 |
| 2,546,189 | Keep et al. | Mar. 27, 1951 |

FOREIGN PATENTS

| Number | Country | Date |
|---|---|---|
| 10,615 | France | 1909 |
| 193,738 | Great Britain | 1923 |